US006624213B2

(12) United States Patent
George et al.

(10) Patent No.: US 6,624,213 B2
(45) Date of Patent: Sep. 23, 2003

(54) HIGH TEMPERATURE EPOXY ADHESIVE FILMS

(75) Inventors: Clayton A. George, Afton, MN (US); William J. Schultz, Vadnais Heights, MN (US); Wendy L. Thompson, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/005,556

(22) Filed: Nov. 8, 2001

(65) Prior Publication Data

US 2003/0125423 A1 Jul. 3, 2003

(51) Int. Cl.$^7$ ................................................ C08L 63/02
(52) U.S. Cl. ........................ 523/201; 523/406; 523/407; 528/93; 528/97; 528/103; 528/119
(58) Field of Search ................................ 523/201, 406, 523/407; 528/93, 97, 103, 119

(56) References Cited

U.S. PATENT DOCUMENTS

| | | |
|---|---|---|
| 2,902,471 A | 9/1959 | Bruin |
| 3,298,998 A | 1/1967 | McConnell et al. |
| 3,316,195 A | 4/1967 | Grosner et al. |
| 3,332,908 A | 7/1967 | Sellers et al. |
| 3,449,280 A | 6/1969 | Frigstad |
| 3,707,583 A | 12/1972 | McKown |
| 3,833,683 A | 9/1974 | Dickie et al. |
| 3,856,883 A | 12/1974 | Dickie et al. |
| 3,864,426 A | 2/1975 | Salensky |
| 3,894,112 A | 7/1975 | Pagel |
| 4,107,116 A | 8/1978 | Riew et al. |
| 4,331,582 A | 5/1982 | Babayan |
| 4,521,490 A | 6/1985 | Pocius et al. |
| 4,684,678 A | 8/1987 | Schultz et al. |
| 4,704,331 A | 11/1987 | Robins et al. |
| 4,904,360 A | 2/1990 | Wilson, Jr. et al. |
| 4,980,234 A | 12/1990 | Almer et al. |
| 5,639,808 A | 6/1997 | Coggio et al. |
| 6,180,696 B1 | 1/2001 | Wong et al. |
| 6,379,799 B1 | 4/2002 | Almen |

FOREIGN PATENT DOCUMENTS

| | | |
|---|---|---|
| JP | 7-165880 | 6/1995 |
| JP | 9-8178 | 1/1997 |
| WO | WO 96/33248 | 10/1996 |
| WO | WO 00/39189 | 7/2000 |

OTHER PUBLICATIONS

Registry File Printout, 107934–40–1, CAS Reg File, Chem. Abstracts, Database, 1995.*
Article: "Ciba Tactix ® XP 71756.00 Epoxy", Advertise with MatWeb, The Online Materials Property Database, matweb.com, Oct. 1, 2001.
Article: "Ciba Tactix ® 556 Epoxy", Advertise with MatWeb, The Online Materials Property Database, matweb.com, Oct. 1, 2001.

* cited by examiner

Primary Examiner—Robert Dawson
Assistant Examiner—D. Aylward
(74) Attorney, Agent, or Firm—Scott A Bardell

(57) ABSTRACT

The invention provides polyepoxide-based adhesives containing cycloaliphatic-containing polyepoxide resin, aromatic polyepoxide resin, and 9,9-bis(3-methyl-4-aminophenyl)fluorene. The adhesives provide improved peel and shear strength.

24 Claims, No Drawings

HIGH TEMPERATURE EPOXY ADHESIVE FILMS

FIELD OF THE INVENTION

This invention relates to high temperature resistant epoxy-based adhesive films.

BACKGROUND OF THE INVENTION

Polyepoxide resins are monomers or prepolymers that react with curing agents to yield high performance resins. These resins have gained wide acceptance in structural adhesives because of their combination of characteristics such as thermal and chemical resistance, adhesion, and abrasion resistance.

Cured epoxy resins are frequently required to have high glass transition temperatures in order to provide adhesives having structural properties at high temperatures. Examples of methods of achieving high glass transition temperatures in such polyepoxide resins include: preparing resins having a high crosslink density and a high concentration of polar groups as disclosed in U.S. Pat. No. 4,331,582; using epoxy resins compositions in which the epoxy-group containing compound contains a polycyclic structure, such as in U.S. Pat. Nos. 2,902,471; 3,298,998; and 3,332,908; using epoxy resin compositions in which the curing agent or hardener contains a polycyclic structure; and combining a 9,9-bis (aminophenyl)fluorene with an aromatic epoxy resin as described in U.S. Pat. No. 4,684,678.

Although many of these compositions can be cured to resins having a high glass transition temperature, the cured resins typically are highly crosslinked, and are brittle or have a low ductility. One method of improving the ductility of such cured resins is by adding a rubber component or toughening agent to the composition. However, many compositions containing cured epoxy resins having a high glass transition temperature are incompatible with such toughening agents.

SUMMARY OF THE INVENTION

In one aspect, the invention provides an adhesive composition comprising a mixture of polyepoxide resins comprising cycloaliphatic-containing polyepoxide resin and aromatic polyepoxide resin and an effective amount of 9,9-bis (3-methyl-4-aminophenyl)fluorene. The mixture of polyepoxide resins has a cycloaliphatic character of greater than 10 weight percent, as defined below. The cycloaliphatic-containing polyepoxide resin is present in the adhesive composition in an amount of at least about 20 to about 80 weight percent, based on the total weight of the polyepoxide resins. The aromatic polyepoxide resin is present in the adhesive composition in an amount of from about 80 to about 20 weight percent, based on the total weight of the polyepoxide resins. In another embodiment, the adhesive composition further comprises a toughening agent.

The adhesive compositions of the invention are useful for providing adhesives that rapidly cure to provide adhesive bonds having both high peel strength and high overlap shear strength at room temperature and at 120° C. to 150° C. or higher.

DETAILED DESCRIPTION OF THE PREFERRED EMBODIMENTS

The adhesive compositions of the invention contain at least one cycloaliphatic-containing polyepoxide resin. The cycloaliphatic-containing polyepoxide resins have epoxide moieties attached to, that is, pendent from, only aromatic groups and have cycloaliphatic groups between the aromatic groups. A general formula for such compounds is $R(X_n)$—$R^1$—$(R(X_p)$—$R^1)r$—$R(X_n)$, where each R is independently at least a divalent aromatic group, each X is an epoxide-containing moiety, each $R^1$ is independently at least a divalent cycloaliphatic group, and p and r are $\geq 0$ and n is at least 1. Examples of such cycloaliphatic groups include the divalent radicals of dicyclopentadiene, cyclopentadiene, norabornane, decalin, and hydrogenated analogs of naphthalene, anthracene, and biphenyl compounds, and combinations thereof. Examples of aromatic groups include mono- and divalent radicals of benzene, naphthalene, bisphenol-A, bisphenol-F, and biphenyl-type compounds, and combinations thereof. The aromatic groups may be substituted, for example, with alkyl groups on the aromatic rings.

In some embodiments, adhesives and adhesive compositions of the invention contain one or more dicyclopentadiene-containing polyepoxide resins. Such resins are generally prepared from the reaction of dicyclopentadiene phenol resin and epichlorohydrin under basic conditions. The detailed preparation procedure can be found in publicly available literature. Examples of useful dicyclopentadiene-containing polyepoxide resins have the formula:

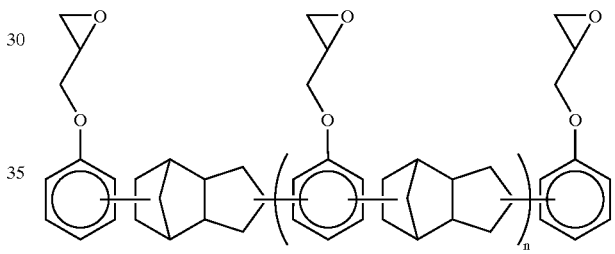

wherein n is an integer from 0 to 7 and may be any integer or fraction in between 0 and 7. Epoxide equivalent weights range from about 150 to about 500. Commercially available dicyclopentadiene-based epoxy resins include HP-7200 from Dainippon Ink and Chemicals, Inc., TACTIX™ 71756 and TACTIX™ 556 epoxy resins, available from Vantico, Inc, Brewster, N.Y.

Cycloaliphatic-containing polyepoxide resin is present in the compositions of the invention in an amount of from 20 to 80 weight percent of the total weight of the polyepoxide resins present in the adhesive composition, and may be present in any whole or fractional amount between 20 and 80 weight percent. In other embodiments, the cycloaliphatic-containing polyepoxide resin is present in the compositions of the invention in an amount of from 25 to 75 weight percent of the total weight of the polyepoxide resins present, and any whole or fractional amount between 25 and 75 weight percent.

Suitable aromatic polyepoxide resins include those containing at least two 1,2-cyclic ethers. Such compounds can be aromatic or heteroaromatic, or can comprise combinations thereof. Suitable polyepoxide resins may be solid or liquid at room temperature. Aromatic polyepoxide resin is used in the adhesives and compositions of the invention to increase the Tg of the cured adhesive film and to provide heat resistance. Aromatic polyepoxide resins do not include polyepoxide resins having both aromatic and cycloaliphatic groups.

Compounds containing at least two epoxide groups (i.e., polyepoxides) are preferred. A combination of polyepoxide compounds may be employed, and an epoxide resin having a functionality of less than two may be used in a combination so long as the overall epoxide functionality of the mixture is at least two. The polymeric epoxies include linear polymers having terminal epoxide groups (e.g., the diglycidyl ether of bisphenol-A) and polymers having pendent epoxy groups (e.g., polyglycidyl ethers of phenolic novolak compounds). It is also within the scope of this invention to use a material with functionality in addition to epoxide functionality but which is essentially unreactive with the epoxide functionality, for example, a material containing both epoxide and acrylic functionality.

A wide variety of commercial epoxide resins are available and listed in "Handbook of Epoxy Resins" by Lee and Neville, McGraw Hill Book Company, New York (1967); and in "Epoxy Resin Technology" by P. F. Bruins, John Wiley & Sons, New York (1968); and in "Epoxy Resins: Chemistry and Technology", $2^{nd}$ Edition" by C. A. May, Ed., Marcel Dekker, Inc. New York (1988). Aromatic polyepoxides (i.e., compounds containing at least one aromatic ring structure, e.g., a benzene ring, and at least two epoxide groups) that can be used in the present invention include the polyglycidyl ethers of polyhydric phenols, such as Bisphenol-A or Bisphenol-F type resins and their derivatives, aromatic polyglycidyl amines (e.g., polyglycidyl amines of benzenamines, benzene diamines, naphthylenamines, or naphthylene diamines), polyglycidyl ethers of phenol formaldehyde resole or novolak resins; resorcinol diglycidyl ether; polyglycidyl derivatives of fluorene-type resins; and glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof.

Preferred aromatic polyepoxides are the polyglycidyl ethers of polyhydric phenols, such as the series of diglycidyl ethers of Bisphenol-A, commercially available from Resolution Performance Products, Houston, Tex., for example, under the trade designations "EPON 828" and "EPON 1001F" and the series of diglycidyl ethers of Bisphenol-A and Bisphenol F and their blends, commercially available from Resolution Performance Products, Pernis, The Netherlands, for example, under the trade designations "Epikote 232" and "Epikote 1001". Other useful commercially available aromatic epoxides include the "DER" series of Bisphenol epoxides and "DEN" series of epoxy novolak resins, available from Dow Chemical, Midland, Mich.; diglycidyl ether of fluorene Bisphenol, available from Resolution Performance Products, Houston, Tex., under the trade designation "EPON HPT Resin 1079"; a triglycidyl derivative of p-aminophenol, commercially available from Ciba Performance Polymers, Brewster, N.Y., under the trade designation "MY 0500"; a tetraglycidyl derivative of methylene dianiline, commercially available from Ciba Performance Polymers, Brewster, N.Y., under the trade designation "MY 720"; and a polyfunctional aromatic epoxy resin commercially available from Resolution Performance Products under the trade designation "EPON SU-8." Flame retardant epoxides may also be used, for example, the flame retardant brominated Bisphenol-A diglycidyl ether, commercially available from Dow Chemical, Midland, Mich., under the trade designation "DER 580". The term "derivative" as used herein with reference to thermosetting materials refers to a base molecule with additional substituents that do not interfere with the thermosetting curing reaction of the base molecule.

Aromatic polyepoxide resin is present in the compositions of the invention in an amount of from 80 to 20 weight percent of the total weight of the polyepoxide resins present in the adhesive composition, and may be present in any whole or fractional amount between 80 and 20 weight percent. In other embodiments, the aromatic polyepoxide resin is present in the compositions of the invention in an amount of from 75 to 25 weight percent of the total weight of the polyepoxide resins present, and any whole or fractional amount between 75 and 25 weight percent.

The combination of cycloaliphatic-containing polyepoxide and aromatic polyepoxide resins have a cycloaliphatic character of greater than 10 weight percent. In one embodiment, the cycloaliphatic character is at least 12 weight percent. In another embodiment, the cycloaliphatic character is at least 13.5 weight percent. In another embodiment, the combined polyepoxide resins have a cycloaliphatic character of not more than about 60 weight percent. In another embodiment, the combined polyepoxide resins have a cycloaliphatic character of not more than about 55 weight percent. In another embodiment, the combined polyepoxide resins have a cycloaliphatic character of not more than about 40 weight percent. In other embodiments, the combined polyepoxide resins have a cycloaliphatic character of from greater than 10 weight percent to about 60 weight percent; at least 12 weight percent to about 55 weight percent; and from about 13.5 weight percent to about 40.5 weight percent, and may be any whole or fractional weight percent in between 12 and 60 weight percent.

"Weight percent cycloaliphatic character" is determined by calculating the weight percent cycloaliphatic groups of the cycloaliphatic-containing polyepoxide, excluding the epoxide-containing moieties attached to the aromatic groups. The value, expressed as a percentage, is then multiplied by the weight percent of cycloaliphatic-containing polyepoxide present in the total amount of polyepoxide resin present in the adhesive composition. For example, if n=1 in the above formula 1, the percent cycloaliphatic character of the cycloaliphatic-containing resin of the formula is 54% (benzene=75.1+76.1+76.1; dicyclopentadiene=134.2; % cycloaliphatic character=268.4/(268.4+227.3)=0.54). If the total amount of cycloaliphatic-containing polyepoxide resins present is 25 weight percent of the total amount of polyepoxide resin, then the polyepoxide resin present in the adhesive composition would have a cycloaliphatic character of 13.5 weight percent (0.54×25).

The curative for the adhesive films and compositions of the invention is 9,9-bis(3-methyl-4-aminophenyl)fluorene (o-TBAF). o-TBAF is present in the compositions in an effective amount. An "effective amount" of o-TBAF is that amount which cures or crosslinks the polyepoxide resins.

The curative is used in the adhesive films and compositions of the invention in a stoichiometric ratio of 0.8 to 1.7 amino hydrogen (NH) equivalents per epoxide equivalent. In one embodiment, a stoichiometric ratio of 1.0 to 1.65 amino hydrogen equivalents per epoxide equivalent is employed. In another embodiment, a stoichiometric ratio of 1.25 to 1.65 amino hydrogen equivalents per epoxide equivalent is used.

The adhesives and adhesive compositions of the invention may contain one or more tougheners or toughening agents. The toughening agent can be introduced as a latex of dispersed or synthetic rubber as is disclosed in U.S. Pat. No. 3,316,195 or a graded rubber or core shell rubber particle as.disclosed in U.S. Pat. Nos. 3,833,683; 3,856,883; and 3,864,426. The toughening agent can also be introduced into the epoxy resin composition by dissolving reactive elastomers into the epoxy resin which phase-separate during curing. The technique is exemplified by U.S. Pat. Nos. 4,107,116 and 3,894,112. A detailed description of the use of toughening agents in epoxy resin is to be found in the Advances in Chemistry Series 208 titled "Rubbery-Modified Thermoset Resins" edited by C. K. Riew and J. K. Gillham, American Chemical Society, Washington, 1984. One specific toughening agent is the insoluble in situ polymerized elastomeric particles that are formed from amine terminated polyethers, for example, diprimary amine endcapped poly (tetramethyleneoxides). Other examples include amine-terminated butadiene/nitrile rubbers, carboxyl-terminated butadiene/nitrile rubbers, and core shell materials.

The adhesive compositions of the invention may contain from about 3 to about 20 weight percent of the total weight of the composition of toughening agent. In other embodiments, the adhesive compositions of the invention may contain from about 3 to about 10 weight percent toughening agent based on the total weight of the composition.

Various other adjuvants can also be added the compositions of the invention to alter the characteristics of the cured adhesive. Useful adjutants include fumed silica, pigments, silica, alumina, magnesium sulfate, calcium sulfate, bentonite, glass beads, glass bubbles, and organic and inorganic fibers. Amounts of up to about 80 weight percent of the total weight of the composition adjuvant can be used.

The adhesive compositions of the invention are generally useful for bonding substrate where both high peel strength and high shear strength at high temperatures are desired.

TEST METHODS

Overlap Shear Test

The shear strength of the adhesive films of the present invention was determined by bonding two aluminum substrates together using the adhesive film and measuring the shear strength of the resulting construction. More specifically, overlap shear strength was determined according to ASTM D-1002 with the following modifications. The adherends were 2024-T3 bare aluminum panels measuring 7 inches long×4 inches wide×0.063 inches thick (178 mm×102 mm×1.60 mm).

The panels were prepared in the following manner. The panels were first degreased by immersing in alkaline degreaser ("Oakite Aluminum Cleaner 164", Oakite Products Inc., Berkeley Heights, N.J.) at about 88° C. for about 10 minutes, followed by rinsing with tap water. The degreased panels were then oxidized by immersing them in a 68° C. bath of concentrated sulfuric acid, sodium dichromate and water for about 10 minutes (this is known as Forest Products Laboratories Etch System or FPL Etch System) then rinsing with tap water. This was designated as "Surface Prep 1".

In some cases, the panels were further treated as follows. The etched panels were anodized by immersion in phosphoric acid at 22° C. with an applied voltage of 15 Volts for 20–25 minutes, followed by rinsing with tap water (test for water break), air drying for 10 minutes at room temperature, then oven drying in a forced air oven at 66° C. for 10 minutes. The resulting anodized aluminum panels were immediately primed within 24 hours of treatment. The anodized panels were primed with a corrosion inhibiting primer for aluminum (3M™ Scotch-Weld™ Structural Adhesive Primer EC-3983, obtained from Minnesota Mining and Manufacturing Company, St. Paul, Minn.) according to the manufacturer's instructions to give a dried primer thickness of between 0.00010 and 0.00020 inches (2.6 to 5.2 micrometers). The complete surface conditioning procedure was designated "Surface Prep 2".

The primed panels were bonded to one another in an overlapping relationship along their lengthwise dimension using a 15.9 mm wide strip of adhesive film. After removing the liner from one side, the scrim-supported film was applied to the first adherend by hand using a small rubber roller in such a manner as to exclude entrapped air and insure intimate contact between the exposed adhesive and the substrate. After removing the second liner, the second adherend was placed in contact with the exposed adhesive surface to give an assembly with an overlap area of 0.5 inches (12.7 mm). The resulting assembly was fastened together using tape and cured in an autoclave in the following manner. After applying a vacuum to reduce the pressure to 28–30 inches (Hg), about 15 pounds per square inch (psi) (103 kPa) pressure was applied and the temperature of the autoclave was heated from room temperature (68° F. to 77° F. (20° C. to 25° C.)) to 350° F. (177° C.) at a rate of 5° F./min. (2.8° C./min.). The vacuum was released when the pressure reached about 15 psi (69 kPa). The final temperature and pressure were maintained for 60 minutes before cooling to about 25° C. The bonded panels were sawn across their width into 1 inch (2.54 cm) wide strips and evaluated for overlap shear strength in accordance with ASTM D-1002 using a grip separation rate of 0.05 inches/minute (1.3 millimeters/minute) using a tensile tester. Testing was conducted at two different test temperatures (room temperature and 177° C.). Samples tested at the elevated temperature were equilibrated for between 10 and 15 minutes prior to testing.

Floating Roller Peel Strength Test

Panels of 2024-T3 bare aluminum measuring 8 inches long×3 inches wide×0.063 inches thick (20.3×7.6×0.16 centimeters), and 10 inches long×3 inches wide×0.025 inches thick (25.4×7.6×0.064 centimeters), were prepared for testing as described above in "Overlap Shear Test". The primed panels were bonded together using the same film adhesive and cure cycle employed for the overlap shear samples, then evaluated for floating roller peel strength in accordance with ASTM D-3167-76 with the following modification. Test strips measuring 0.5 inch (12.7 cm) wide were cut along the lengthwise direction of the bonded aluminum panels. A tensile testing machine operated at a rate of 12 inches/minute (30.5 cm/minute) was used to peel the thinner substrate from the thicker one, and the results normalized to a width of 1 inch.

| | Materials |
|---|---|
| CAF | 9,9-bis(3-chloro-4-aminophenyl)fluorene, having a theoretical amine hydrogen equivalent weight of 103.3 grams/equivalent. |
| DER 332 | a liquid bisphenol-A based epoxy resin having an epoxide equivalent of from 172 to 176, available from Dow Chemical Company, Midland, MI. |
| EPON ™ SU-8 | a solid polymeric aromatic epoxy resin having an average epoxide group functionality of around 8, available from Resolution Performance Products, Houston, TX. |
| TACTIX XP-71756 | a dicyclopentadienyl-based epoxy resin, available from Vantico, Incorporated, Brewster, NY. |
| UVR 6105 | 3,4-epoxycyclohexylmethyl-3,4-epoxycyclohexyl-carboxylate, having an epoxide equivalent of from 130–135 obtained from Union Carbide, Danbury, CT. |
| DICY | dicyandiamide, available as Amicure ™ CG-1200 from Air Products and Chemicals, Incorporated, Allentown, PA. |

-continued

| Materials | |
|---|---|
| o-TBAF | 9,9-bis(3-methyl-4-aminophenyl)fluorene, having a theoretical amine hydrogen equivalent weight of 94.5 grams/equivalent. |
| Rubber Toughener | diprimary amine endcapped poly(tetramethylene oxide), number average molecular weight of 7500. |
| Alumina | atomized alumina powder, available as MD-201 from Alcan Metal Powders, Union, NJ. |

EXAMPLES

Preparation of Resin Compositions

TACTIX™ XP-71756 and SU-8 polyepoxide resins were charged into a 1 gallon (3.8 liter) kneader mixer. The polyepoxide resin mixture was heated, using a steam jacket, to 300° F. (149° C.) with mixing. For Comparative Examples 1–4 and Examples 4 and 5, the DER™ 332 polyepoxide resin was then added with stirring. Next, while continuing to mix and heat the polyepoxide resins at 300° F. (149° C.), a rubber toughening agent preheated to 160° F. (71° C.) was slowly added to the polyepoxide mixture over a period of about 15 minutes. The polyepoxide resin/rubber toughening agent blend was mixed at 300° F. (149° C.) for two hours, then cooled to 250 OF (121° C.) using a water jacket. At this point DER™ 332 polyepoxide resin was then added, if it had not already been done so, with continued mixing. After further cooling to between about 140° F. and 160° F. (60° C. and 71° C.), the fluorene amine curing agent was added in a single charge with mixing, followed by addition of dicyandiamide in the same manner. Finally, in those examples where filler was employed, it was added in a similar fashion as the curing agents. Mixing was continued for 10 minutes at a temperature between about 140° F. and 160° F. (60° C. and 71° C.) after all the components were thoroughly combined.

Preparation of Uncured, Liner-supported Adhesive Films

The heated composition from the "Preparation of Resin Compositions" procedure above was coated onto a 0.005 inch (0.13 mm) thick paper liner, having a silicone coating on one side and a polyethylene coating on the opposite side using a knife-over-bed coating station having a gap setting of 0.007 inches (0.18 millimeters) greater than the release liner thickness and a bed and knife temperature of 160° F. (71° C.). The adhesive composition was coated onto the silicone-treated side of the liner to give a liner supported adhesive film. The adhesive-coated liner was wound up on itself, allowed to stand for 24 hours at room temperature (about 70° F. (21° C.)), then stored at −20° F. (-29° C.) until further use.

Preparation of Uncured, Glass Scrim-supported Adhesive Films

Samples of liner-supported film adhesive were equilibrated at room temperature prior to use. One piece of the liner-supported adhesive film, measuring about 11.5 inches (29.2 centimeters) wide and about 36 inches (91.4 centimeters) long, was placed on each side of a glass scrim. The glass scrim employed was either: 1) CS 207, a 1299 style glass fabric having an aminosilane treatment, available from Clark-Schwebel Fiberglass Corp., White Plains, N.Y.; or 2) 108 E glass fabric finished with S-920 finish, an epoxy silane treatment, available from J. P. Stevens and Co. Inc., Slater, S.C., as indicated in Tables 1 and 3 below. This lay-up was passed between two rubber-coated, heated nip rollers at a pressure of about 40 pounds and a temperature between about 140° F. and 160° F. (60° C. and 71° C.) to give a glass scrim-supported adhesive film, also described as an adhesive film having a glass scrim embedded therein, having release liner on each side.

Examples 1–7 and Comparative Examples (CE) 1–9 in Tables 1 and 2 below demonstrate the range of amount of cycloaliphatic epoxy resin that can be used in the compositions of the present invention. The amounts are given in parts by weight (pbw), wherein the combined amounts of all components is 100 pbw. The weight percent aliphatic character was calculated as described above.

Comparative Examples 7–9 were prepared as described above except CAF was used as the curative in place of o-TBAF and UVR 6105 was used in place of TACTIX 71756 in Comparative Example 7. Additionally, Comparative Examples 7 and 8 were also prepared and evaluated using a post cure of 2 hours at 350° F. (177° C.).

TABLE 1

| Ex. | DER 332 (wt. %) (% of Epoxy) | TACTIX XP-71756* (wt. %) (% of Epoxy) | SU-8 (wt. %) (% of Epoxy) | o-TBAF (wt. %) (NH eqvts.) | CAF (wt. %) (NH egvts.) | DICY (wt. %) | Rubber Toughener (wt. %) | ScrimType | Surface Prep |
|---|---|---|---|---|---|---|---|---|---|
| CE 1 | 49.6 (100) | 0.0 | 0.0 | 40.4 (1.50) | | 1.0 | 9.0 | 2 | 2 |
| CE 2 | 47.6 (100) | 0.0 | 0.0 | 42.7 (1.65) | | 1.0 | 8.7 | 2 | 2 |
| CE 3 | 25.7 (50) | 0.0 | 25.7 (50) | 38.0 (1.50) | | 1.0 | 9.6 | 2 | 1 |
| CE 4 | 24.7 (50) | 0.0 | 24.7 (50) | 40.3 (1.65) | | 1.0 | 9.3 | 2 | 1 |
| CE 5 | 21.6 (41.2) | 9.1 (17.5) | 21.6 (41.2) | 936.9 (1.5) | | 1.0 | 9.8 | 2 | 2 |
| CE 6 | 21.1 (41.2) | 8.8 (17.5) | 13.0 (41.2) | 38.5 (1.65) | | 1.0 | 9.5 | 2 | 2 |
| CE 7 | 11.9 (25.0) | 23.9* (50) | 12.0 (25.0) | | 42.2 (1.50) | 1.0 | 9.0 | 2 | 2 |

TABLE 1-continued

| Ex. | DER 332 (wt. %) (% of Epoxy) | TACTIX XP-71756* (wt. %) (% of Epoxy) | SU-8 (wt. %) (% of Epoxy) | o-TBAF (wt. %) (NH eqvts.) | CAF (wt. %) (NH egvts.) | DICY (wt. %) | Rubber Toughener (wt. %) | ScrimType | Surface Prep |
|---|---|---|---|---|---|---|---|---|---|
| CE 8 | 17.0 (33.3) | 25.5 (50) | 8.5 (16.7) | | 38.4 (1.50) | 1.0 | 9.6 | 2 | 2 |
| CE 9 | 16.4 (33.3) | 24.6 (50) | 8.2 (16.7) | | 40.6 (1.65) | 1.0 | 9.2 | 2 | 2 |
| 1a | 26.0 (50) | 13.0 (25) | 12.5 (25) | 37.2 (1.65) | | 1.0 | 9.8 | 2 | 1 |
| 1b | 25.1 (50) | 12.5 (25) | 12.5 (25) | 39.4 (1.65) | | 1.0 | 9.5 | 2 | 2 |
| 2 | 13.5 (25) | 27.0 (50) | 13.5 (25) | 35.0 (1.50) | | 1.0 | 10 | 2 | 1 |
| 3 | 13.0 (25) | 26.0 (50) | 13.0 (25) | 37.2 (1.65) | | 1.0 | 9.8 | 2 | 1 |
| 4 | 26.4 (50) | 26.4 (50) | 0.0 | 36.2 (1.50) | | 1.0 | 9.9 | 1 | 1 |
| 5 | 25.5 (50) | 25.5 (50) | 0.0 | 38.5 (1.65) | | 1.0 | 9.6 | 1 | 1 |
| 6 | 6.9 (12.5) | 41.5 (75) | 6.9 (12.5) | 33.3 (1.5) | | 1.0 | 10.4 | 2 | 2 |
| 7 | 6.7 (12.5) | 40.2 (75) | 6.7 (12.5) | 35.4 (1.65) | | 1.0 | 10.0 | 2 | 2 |

*Comparative Example 7 employed the cycloaliphatic resin UVR 6105 in place of TACTIX XP-71756.

TABLE 2

| Ex. | Overlap Shear Strength @ R.T. (psi) | Overlap Shear Strength @ 350° F. (177° C.) (psi) | Floating Roller Peel Strength @ R.T. (piw) | % Cycloaliphatic Character in Polyepoxide Mixture |
|---|---|---|---|---|
| CE 1 | 3740 | 1617 | 19.0 | 0 |
| CE 2 | 2907 | 1057 | 12.0 | 0 |
| CE 3 | 2093 | 647 | 23.0 | 0 |
| CE 4 | 2133 | 737 | 19.0 | 0 |
| CE 5 | 3220 | 2013 | 7.0 | 9.5 |
| CE 6 | 3407 | 2100 | 9.5 | 9.5 |
| CE 7 | 1769 | 263 | 5.5 | 43.6 |
| CE 8 | 4727 | 773 | 42.0 | 27.0 |
|  | 5727* | 1740* | 42.5* |  |
| CE 9 | 4040 | 660 | 42.0 | 27.0 |
|  | 5070* | 1553* | 39.5* |  |
| 1a | 3287 | 1873 | 26.0 | 13.5 |
| 1b | 3400 | 2700 | 28.0** | 13.5 |
| 2 | 3620 | 2227 | 32.5 | 27.0 |
| 3 | 3333 | 2593 | 32.5 | 27.0 |
| 4 | 4283 | 2192 | 32.5 | 27.0 |
| 5 | 4157 | 1967 | 32.5 | 27.0 |
| 6 | 5050 | 2860 | 26.5 | 40.5 |
| 7 | 4580 | 2667 | 25.0 | 40.5 |

*after post cure of 2 hours at 350° F. (177° C.).
**data obtained on a second, separate preparation The results in Table 2 demonstrate that compositions of the invention, that is, those whose epoxide component contains above 10% cycloaliphatic character (as defined herein) and whose curing agent is o-TBAF, exhibit a combination of overlap shear values at 350° F. (177° C.) (of at least about 1900 pounds/inch$^2$ (psi) (13.1 megaPascals) and Floating Roller Peel Strength peel values (at room temperature) of at least about 20 pounds/inch width (piw) (3.5 Newtons/millimeter). In contrast, compositions containing essentially only difunctional aromatic epoxide resin (e.g., DER 332) or a combination of multifunctional and essentially difunctional aromatic epoxide resins (e.g., DER 332 and SU-8) do not exhibit such characteristics. Further, compositions employing a cycloaliphatic epoxide component falling outside the definition of cycloaliphatic-containing polyepoxide resin used herein does not exhibit such performance characteristics. In addition, the use of an alternative fluorene amine curing agent (CAF) in the adhesive compositions does not exhibit such performance characteristics.

The Examples in Tables 3 and 4 below demonstrate that a range of amounts of the epoxy curing agent, o-TBAF, can be employed in the compositions of the invention. A 1299 style glass fabric scrim and 3M™ Scotch-Weld™ Structural Adhesive Primer EC-3983 were employed for these samples.

TABLE 3

| Ex. | DER 332 (wt. %) (% of Epoxy) | TACTIX XP-71756 (wt. %) (% of Epoxy) | SU-8 (wt. %) (% of Epoxy) | o-TBAF (wt. %) (NH eqvts.) | DICY (wt. %) | Rubber Toughener (wt. %) | Filler (wt. %) |
|---|---|---|---|---|---|---|---|
| 8 | 17.5 (33) | 26.2 (50) | 8.7 (17) | 27.7 (1.20) | 1.0 | 9.9 | 9.0 |
| 9 | 16.9 (33) | 25.3 (50) | 8.5 (17) | 30.1 (1.35) | 0.9 | 9.6 | 8.7 |
| 10 | 16.2 (33) | 24.3 (50) | 8.1 (17) | 32.2 (1.50) | 0.9 | 9.2 | 9.1 |

TABLE 3-continued

| Ex. | DER 332 (wt. %) (% of Epoxy) | TACTIX XP-71756 (wt. %) (% of Epoxy) | SU-8 (wt. %) (% of Epoxy) | o-TBAF (wt. %) (NH eqvts.) | DICY (wt. %) | Rubber Toughener (wt. %) | Filler (wt. %) |
|---|---|---|---|---|---|---|---|
| 11 | 15.8 (33) | 23.5 (50) | 7.8 (17) | 34.1 (1.65) | 0.9 | 9.0 | 8.9 |

TABLE 4

| Ex. | Overlap Shear Strength @ R.T. (psi) | Overlap Shear Strength @ 350° F. (177° C.) (psi) | Floating Roller Peel Strength @ R.T. (piw) | % Cycloaliphatic Character in Polyepoxide Mixture |
|---|---|---|---|---|
| 8 | 4307 | 2903 | 30.0 | 27.0 |
| 9 | 4457 | 2967 | 37.5 | 27.0 |
| 10 | 4450 | 2860 | 34.5 | 27.0 |
| 11 | 4610 | 2928 | 38.5 | 27.0 |

The results in Table 4 show that a range of amounts of epoxy curing agent can be employed in the compositions of the invention. In the examples above, an amount in excess of stoichiometric was employed. This excess ranged from 1.20 to 1.65 amino hydrogen equivalents per epoxide equivalent. In addition, these examples demonstrate the use of filler to improve shear performance at elevated temperature.

All patents, patent applications, and publications cited herein are each incorporated by reference, as if individually incorporated. The various modifications and alterations of this invention will be apparent to those skilled in the art without departing from the scope and spirit of this invention. This invention should not be restricted to that set forth herein for illustrative purposes.

What is claimed is:

1. A curable adhesive composition comprising a mixture of:
    a) a mixture of polyepoxide resins comprising from 20 to 80 weight percent cycloaliphatic-containing polyepoxide resin and from 80 to 20 weight percent aromatic polyepoxide resin, wherein the polyepoxide mixture has a cycloaliphatic character of greater than 10 weight percent; and
    b) an effective amount of 9,9-bis(3-methyl-4-aminophenyl)fluorene.

2. The adhesive composition according to claim 1 further comprising a toughening agent.

3. The adhesive composition according to claim 1 wherein the aromatic epoxy resin is selected from the group consisting of polyglycidyl ethers of polyhydric phenols; aromatic polyglycidyl amines; polyglycidyl ethers of phenol formaldehyde resole resins; polyglycidyl ethers of phenol formaldehyde novolak resins; resorcinol diglycidyl ether; polyglycidyl derivatives of fluorene-containing resins; glycidyl esters of aromatic carboxylic acids; and mixtures thereof.

4. The adhesive composition according to claim 1 wherein the 9,9-bis(3-methyl-4-aminophenyl)fluorene is present in the adhesive composition in an amount from 0.8 to 1.7 amino hydrogen (NH) equivalents per epoxide equivalent.

5. The adhesive composition according to claim 1 wherein the cycloaliphatic-containing polyepoxide resin has the formula:

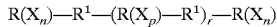

$$R(X_n)-R^1-(R(X_p)-R^1)_r-R(X_n)$$

where each R is independently at least a divalent aromatic group, each X is an epoxide-containing moiety, each $R^1$ is independently at least a divalent cycloaliphatic group, and p and r are $\geq 0$ and n is at least 1.

6. The adhesive composition according to claim 1 wherein the aromatic polyepoxide resin is selected from the group consisting of diglycidyl ethers of Bisphenol-A; diglycidyl ethers of Bisphenol-F; epoxy novolak resins; diglycidyl ether of fluorene Bisphenol; triglycidyl derivatives of p-aminophenol; and combinations thereof.

7. The adhesive composition according to claim 2 wherein the toughening agent is selected from the group consisting of amine terminated polyethers, amine-terminated butadiene/nitrile rubbers, carboxyl-terminated butadiene/nitrile rubbers, core shell materials, and combinations thereof.

8. The adhesive composition according to claim 2 wherein the toughening agent is present in an amount of from about 3 to about 20 weight percent of the total weight of the adhesive composition.

9. The adhesive composition according to claim 1 wherein the cycloaliphatic-containing polyepoxide resin is present in an amount of from 25 to 75 weight percent based on the total weight of polyepoxide resin.

10. The adhesive composition according to claim 1 wherein the aromatic polyepoxide resin is present in an amount of from 75 to 25 weight percent based on the total weight of polyepoxide resin.

11. The adhesive composition of claim 1 wherein the weight percent cycloaliphatic character of the polyepoxide resins is not more than 60 weight percent.

12. The adhesive composition of claim 1 wherein the weight percent cycloaliphatic character of the polyepoxide resins is from greater than 10 to about 60 weight percent.

13. The adhesive composition of claim 1 wherein the cycloaliphatic-containing polyepoxide resin has the formula:

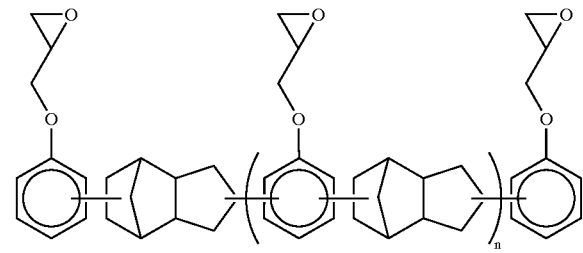

wherein n is an integer from 0 to 7.

14. The adhesive composition according to claim 13 wherein the aromatic polyepoxide resin comprises diglycidyl ether of Bisphenol A.

15. The adhesive composition of claim 1 wherein the polyepoxide resins have an aliphatic character of from about 12 to about 55 weight percent.

16. The adhesive composition of claim 14 wherein the polyepoxide resins have a weight percent cycloaliphatic character of 13.5 to 40.5.

17. The adhesive composition of claim 2 wherein the toughening agent comprises amine terminated polyether.

18. The adhesive composition of claim 17 wherein the cycloaliphatic-containing polyepoxide resin has the formula:

$$R(X_n)-R^1-(R(X_p)-R^1)_r-R(X_n)$$

where each R is independently at least a divalent aromatic group, each X is an epoxide-containing moiety, each $R^1$ is independently at least a divalent cycloaliphatic group, and p and r are $\geq 0$ and n is at least 1.

19. The adhesive composition of claim 18 wherein the aromatic polyepoxide resin is selected from the group consisting of polyglycidyl ethers of polyhydric phenols; aromatic polyglycidyl amines; polyglycidyl ethers of phenol formaldehyde resole resins; polyglycidyl ethers of phenol formaldehyde novolak resins; resorcinol diglycidyl ether; polyglycidyl derivatives of fluorene-containing resins; glycidyl esters of aromatic carboxylic acids, and mixtures thereof.

20. The adhesive composition of claim 17 wherein the cycloaliphatic character of the polyepoxide mixture is not more than 60 weight percent.

21. The adhesive composition of claim 17 wherein cycloaliphatic character of the polyepoxide mixture is at least 12 weight percent and not more than 55 weight percent.

22. The adhesive composition of claim 17 wherein the cycloaliphatic character of the poxyepoxide mixture is from about 13.5 to about 40.5 weight percent.

23. The adhesive composition of claim 22 wherein the cycloaliphatic-containing polyepoxide has the formula:

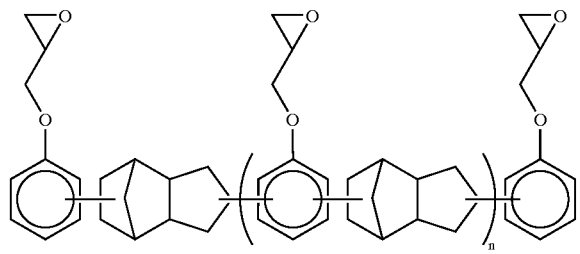

wherein n is an integer from 0 to 7.

24. The adhesive composition of claim 23 wherein the aromatic polyepoxide resin comprises diglycidyl ether of Bisphenol-A.

* * * * *

UNITED STATES PATENT AND TRADEMARK OFFICE
CERTIFICATE OF CORRECTION

PATENT NO. : 6,624,213 B2
APPLICATION NO. : 10/005556
DATED : September 23, 2003
INVENTOR(S) : Clayton A. George It is certified that error appears in the above-identified patent and that said Letters Patent is hereby corrected as shown below:

Column 2
Lines 4-5, delete "$R(X_n)-R^1-(R(X_p)-R^1)r-R(X_n)$" and insert
-- $R(X_n)-R^1-(R(X_p)-R^1)_r-R(X_n)$ --, therefor.

Column 4
Line 65, delete "as.disclosed" and insert -- as disclosed --, therefor.

Column 6
Line 60 (APPROXIMATELY), delete "TACTIX" and insert -- TACTIX™ --, therefor.

Column 7
Line 28 (APPROXIMATELY), delete "250 OF" and insert -- 250 °F --, therefor.

Column 8
Line 43-44, delete "TACTIX 71756" and insert -- TACTIX™ XP-71756 --, therefor.

Columns 7-8, TABLE 1 (Col. 3)
Heading, Line 1, delete "TACTIX" and insert -- TACTIX™ --, therefor.

Columns 7-8, TABLE 1 (Col. 6)
Heading, Line 4, delete "egvts." and insert -- eqvts. --, therefor.

Columns 9-10, TABLE 1 (Col. 3)
Heading, Line 1, delete "TACTIX" and insert -- TACTIX™ --, therefor.

Columns 9-10, TABLE 1 (Col. 6)
Heading, Line 4, delete "egvts." and insert -- eqvts. --, therefor.

Columns 9-10, TABLE I
Footnote *, below Table 1, delete "TACTIX" and insert -- TACTIX™ --, therefor.

Columns 9-10, TABLE 3 (Col. 3)
Heading, Line 1, delete "TACTIX" and insert -- TACTIX™ --, therefor.

Columns 11-12, TABLE 3 (Col. 3)
Heading, Line 1, delete "TACTIX" and insert -- TACTIX ™--, therefor.

UNITED STATES PATENT AND TRADEMARK OFFICE
CERTIFICATE OF CORRECTION

PATENT NO.         : 6,624,213 B2
APPLICATION NO.    : 10/005556
DATED              : September 23, 2003
INVENTOR(S)        : Clayton A. George It is certified that error appears in the above-identified patent and that said Letters Patent is hereby corrected as shown below:

<u>Column 14</u>
Line 6, in Claim 22, delete "poxyepoxide" and insert -- polyepoxide --, therefor.

Signed and Sealed this

Fourteenth Day of November, 2006

JON W. DUDAS
*Director of the United States Patent and Trademark Office*